(12) United States Patent
Berlioz et al.

(10) Patent No.: US 6,400,283 B1
(45) Date of Patent: Jun. 4, 2002

(54) ALTITUDE AND VERTICAL SPEED INDICATOR FOR AIRCRAFT

(75) Inventors: Raymond Jacques Gérard Berlioz, Salon de Provence; Philippe Alain Jean Rollet; Vincent Frédéric Saintagne, both of Velaux, all of (FR)

(73) Assignee: Eurocopter France, Marignane Cedex (FR)

( * ) Notice: Subject to any disclaimer, the term of this patent is extended or adjusted under 35 U.S.C. 154(b) by 724 days.

(21) Appl. No.: 08/761,671

(22) Filed: Dec. 6, 1996

(30) Foreign Application Priority Data

Dec. 8, 1995 (FR) .............................................. 95 14553

(51) Int. Cl.⁷ .............................................. G01C 23/00
(52) U.S. Cl. ...................... 340/975; 340/973; 340/977
(58) Field of Search ................................ 340/971, 973, 340/974, 975, 977; 73/178 R, 179; 364/424.012, 424.06; 701/3, 14

(56) References Cited

U.S. PATENT DOCUMENTS 3,545,269 A   12/1970   Sherbert, Jr.
4,247,843 A * 1/1981   Miller et al. ................. 340/973
4,860,007 A * 8/1989   Konicke et al. ............. 340/977
5,185,606 A * 2/1993   Verbaarschot et al. ...... 340/975
5,250,947 A * 10/1993  Worden et al. ............. 340/975

FOREIGN PATENT DOCUMENTS

EP            0324195           7/1989

* cited by examiner

Primary Examiner—Brent A. Swarthout
(74) Attorney, Agent, or Firm—Stevens, Davis, Miller & Mosher, LLP

(57) ABSTRACT

In an altitude and vertical speed indicator for aircraft, an altitude indicator includes a graduated scale vertically mobile past a fixed marker and a vertical speed indicator includes a pointer rotatable about the point of intersection of a straight line segment through the fixed marker and a straight line segment through the pointer and pointing towards the mobile scale. The angle defined by the fixed marker and the pointer is representative of the vertical speed value.

5 Claims, 3 Drawing Sheets

ALTITUDE AND VERTICAL SPEED INDICATOR FOR AIRCRAFT

BACKGROUND OF THE INVENTION

1. Field of the Invention

The present invention concerns an altitude and vertical speed indicator for aircraft.

2. Description of the Prior Art

For a rotary or fixed wing aircraft climbing or descending to a given altitude, for example a flight level required by air traffic control, is generally effected at a stable vertical speed.

On approaching the required altitude, the pilot of the aircraft progressively reduces the vertical speed of the aircraft so as to reach said altitude with a vertical speed that is sufficiently low to avoid any significant overshoot of the required altitude.

This reduction in the vertical speed on approaching the required altitude may be based on the pilot's judgement or on empirical rules, the pilot monitoring the evolution (position and speed) of the altitude indication [a pointer on conventional instruments or an index in a system of symbols known in aviation as EFIS (Electronic Flight Instruments System)].

For example, one conventional empirical rule is to begin reducing the vertical speed on reaching a fraction of the distance between the required altitude and the current altitude (1/10, for example), and to repeat this process to reduce the vertical speed progressively.

Nevertheless, regardless of the strategy employed (based on judgement or on the use of an empirical rule), these methods require a good knowledge and experience of the performance of the aircraft and introduce a significant workload into a change of flight situation, i.e. at a time when the pilot should be concentrating on other related tasks, for example air traffic or navigation. The following points in particular should be emphasized:

the method based on judgement requires continued attention to the altitude indicator. The anticipation altitude difference, i.e. the altitude difference from which the pilot must begin to reduce the vertical speed of the aircraft, is not necessarily easy to estimate, and the convergence with the required altitude must be monitored attentively if the procedure is not to be terminated too high or too low, which would make it necessary to resume the procedure for "interception" of the required altitude, making it take longer;

using an empirical method, as described previously, the method is itself difficult to use since it is based on correlating two independent indications (vertical speed and altitude). It may also be complex if the interception altitude is not a round figure, for example, 1 875 feet), which is routine in approach procedures;

the pilot's attention is concentrated on the two indicators throughout the anticipation maneuver, and then during adjustments to stabilize the required altitude, which has the following effects:

with conventional circular indicators, the task is difficult because of the need for a relatively wide visual scan between the two indicators, usually in the vertical direction (which is less "natural" than a scan in the horizontal direction) and the total absence of visual correlation, and therefore analogy, between the two indications (the movement and the dynamics of the pointers of the two indicators are different);

if the altitude indication is numerical or "pseudo-numerical" (multidigit drum for current value, plus scrolling scale) on a pilot display screen of an EFIS instrumentation, the difficulty of monitoring the vertical speed from the movement of the altitude scale and, more generally, the absence of specific visual aids for determining the anticipation altitude difference, despite the proximity of the two indicators, constitutes a heavy workload.

Document U.S. Pat. No. 4,860,007 discloses an altitude and vertical speed indicator for aircraft comprising:

first and second sensors for the altitude and the vertical speed of the aircraft, respectively, means for processing the signals supplied by said first and second sensors, and means for displaying the processed signals, having on a display screen:
  altitude indication means, and
  vertical speed indication means of an appropriate kind in line with said altitude indication means, said altitude indication means and said vertical speed indication means being coupled so that the altitude indication in line with the vertical speed indication represents, at all times, a future altitude for the current vertical speed.

However, in the disclosure of this document, it is essentially a question of pointing to a chosen altitude value identified by a marker, by matching to the chosen altitude the vertical speed appropriate to this objective. Despite the presence of a marker of this kind, reading off the altitude from the position of the vertical speed pointer may remain doubtful for the pilot.

One aim of the present invention is to remove this drawback.

SUMMARY OF THE INVENTION

To this end, in the altitude and vertical speed indicator for aircraft of the invention, said altitude indicator means comprise a graduated scale vertically mobile past a fixed marker and said vertical speed indicator means comprise a pointer rotatable about the point of intersection of a straight line segment through said fixed marker and a straight line segment through said pointer and pointing towards said mobile scale, the angle defined by said fixed marker and said pointer being representative of the vertical speed value.

Accordingly, when the vertical speed indication lines up with the required altitude indication, all that is required is to maintain the vertical speed indication locked onto the required altitude indication until the latter is reached, which is reflected in a progressive reduction in the vertical speed to an at least substantially zero vertical speed. In particular, the presentation of the pointer in line with the vertically scrolling scale provides at all times a very close link between the altitude and vertical speed scales, by associating the future altitude with a vertical speed. Thus the indicator of the present invention provides the pilot of the aircraft with an analogous and interconnected indication, on a display screen, of altitude and vertical speed for guiding acquisition of a required barometric (or radar) altitude without displaying the current value of the altitude of the aircraft, until the required altitude is actually reached.

In particular, said pointer may be symbolized on said display screen by a straight line segment.

The processor means may include a digital computer for converting physical altitude and vertical speed data into data suitable for display on said display screen and a symbol generator for showing on said screen, based on information supplied by said computer, the graphical characteristics of the presentation of the altitude and vertical speed information, and, between said first and second sensors and said digital computer, a primary reference system supplying the altitude and vertical speed information in digital form.

The vertical speed indicator pointer is advantageously disposed between said artificial horizon and the altimeter on an aircraft instrument panel screen showing an artificial horizon.

The figures in the accompanying drawings indicate how the invention may be put into effect. In the figures, the same reference numbers identify similar components.

DETAILED DESCRIPTION OF THE INVENTION

Figure 1:
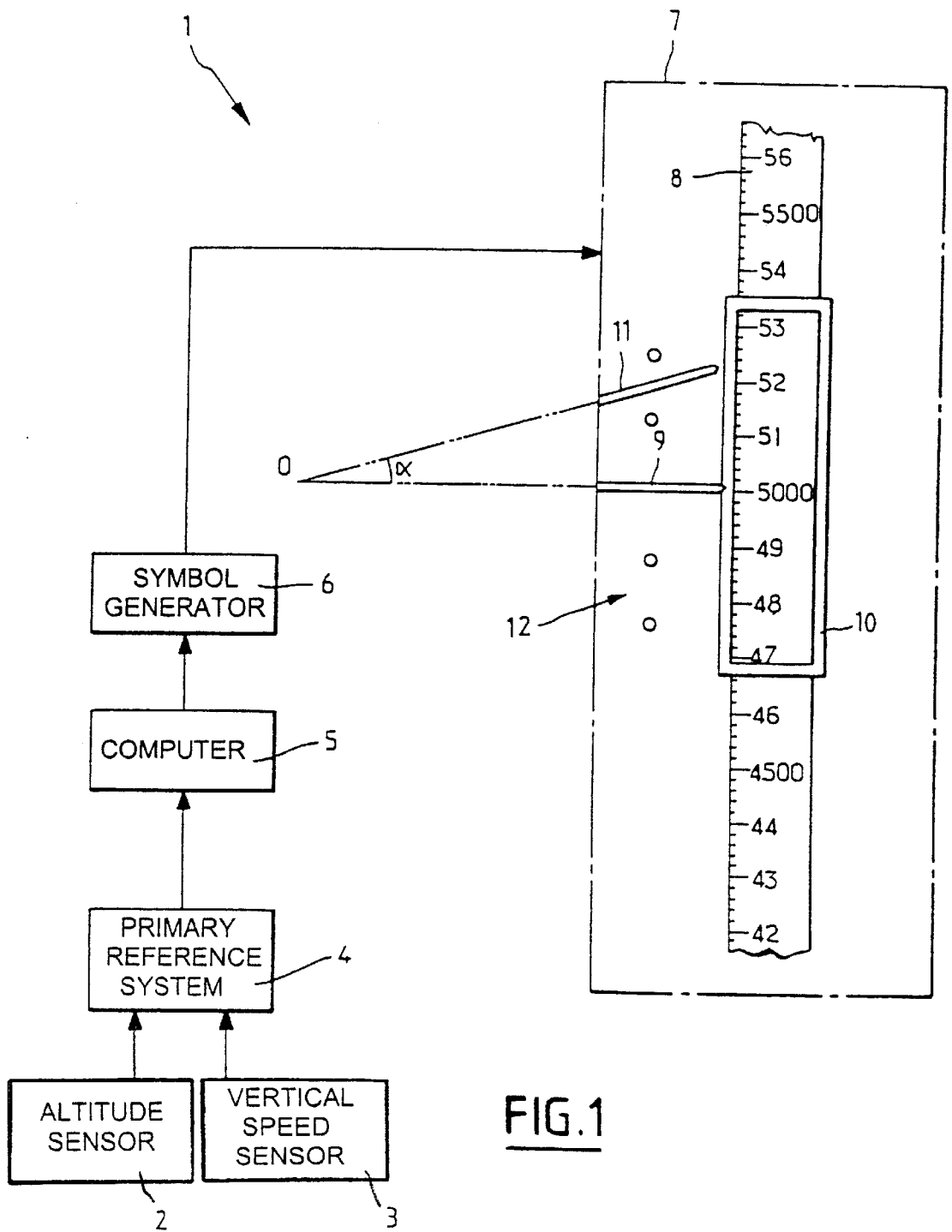
FIG. 1 is a diagrammatic representation of the aircraft altitude and vertical speed indicator of the invention.

FIG. 1 shows the aircraft altitude and vertical speed indicator 1 in accordance with the invention.

As shown here, the indicator 1 comprises various sensors, in particular a barometric or radar sensor 2 for measuring altitude and a sensor 3 for measuring vertical speed. The sensors 2, 3 supply information via a primary reference system 4 and a computer 5 to a symbol generator 6 that displays side by side on the display screen 7 the processed altitude and vertical speed information.

To be more precise, by measuring the atmospheric pressure, the primary reference system 4 provides altitude and vertical speed information in digital form. The computer 5 is a digital computer converting this physical data into data suitable for display on a screen. The symbol generator 6, or plotting machine, displays on the display screen 7 the graphical characteristics of the presentation of the altitude and vertical speed information derived from the information supplied by the computer 5.

The altitude and vertical speed information are shown on the display screen 7 in the following manner (FIG. 1):

the altitude indication is in the form of a scrolling scale 8 moving vertically past a fixed index or marker 9, the combination being displayed within a window 10, the vertical speed indication is represented by the angular rotation of a symbol in the shape of a pointer 11 (symbolized by a straight line segment) around an axis perpendicular to the screen 7 (angle α about the point 0 which is the intersection of straight line segments through the fixed marker 9 and the pointer 11); the upward (downward) rotation angle α of the pointer 11 relative to the horizontal direction of the screen 7 is directly proportional (fixed speed scale 12) to the rate of climb (descent)—the relation is not necessarily linear over all of the range of measurement.

Note that the end of the vertical speed symbol (pointer 11) points towards the scrolling altitude scale 8 and that the two scales 8, 12 are such that the altitude graduation in line with the vertical speed symbol represents a predicted altitude if the pilot continues to climb (or descend). The measurement range and the resolution of the vertical speed indication are matched to those for the altitude indication so that the altitude and vertical speed symbols of the invention are logically linked, which facilitates the acquisition of an altitude.

Figure 2:
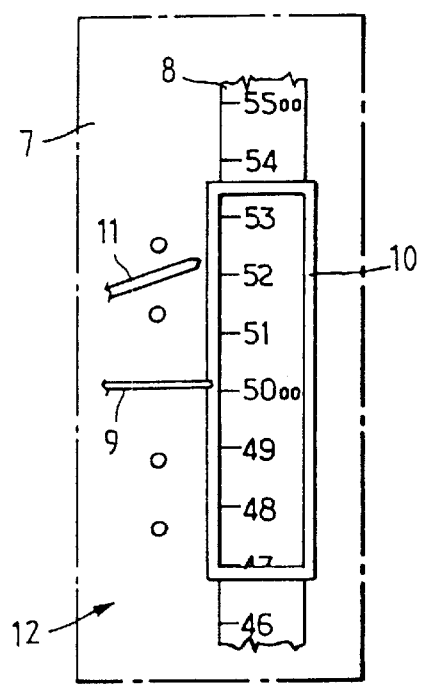
FIGS. 2 and 3a–3c show how the indicator of the invention is used to reach a required altitude.
Figure 3A:
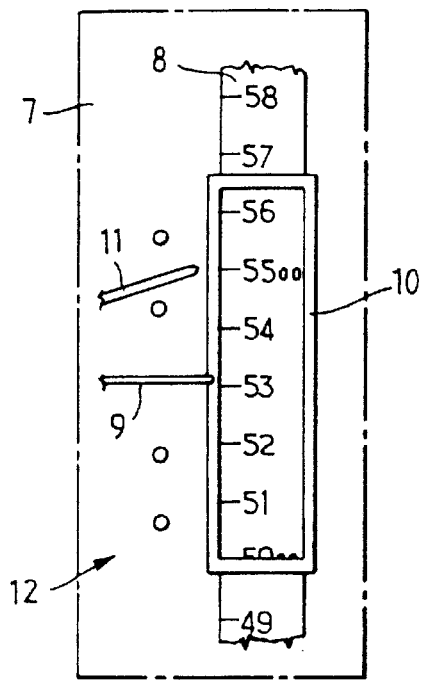
Figure 3B:
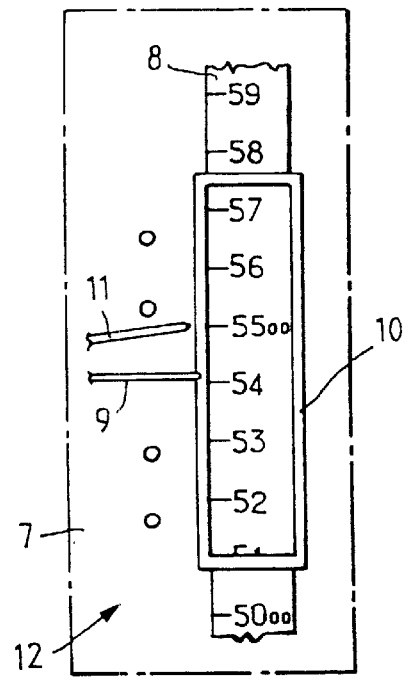
Figure 3C:
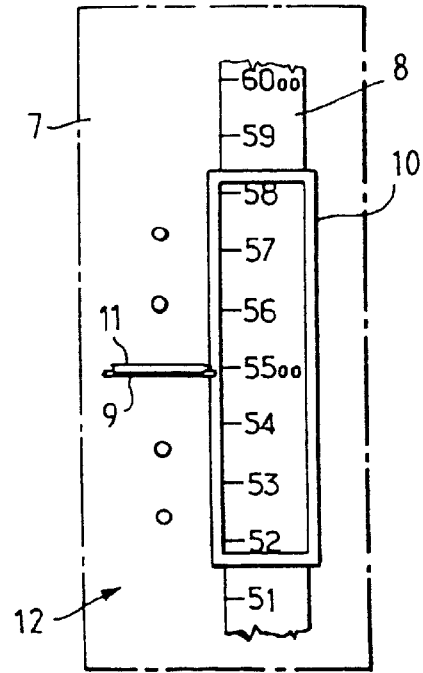
Figure 4:
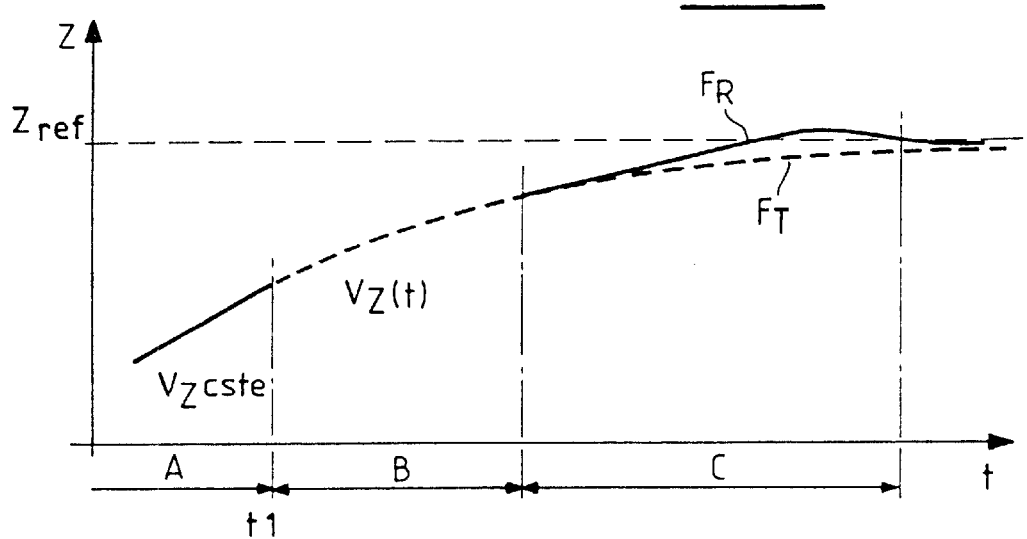
FIG. 4 is a graph showing the altitude as a function of time up to the required altitude obtained using the indicator of the invention.

In accordance with the present invention, the interception of an altitude may be divided into two phases, as follows:

phase 1 (FIG. 2): the pilot sets a vertical speed of his choice such that the graduation corresponding to the required altitude (in the example shown, the aim is to climb to an altitude of 5 500 feet) does not appear in the window 10 of the scrolling altitude scale 8 or remains above a straight line segment through the vertical speed symbol 11;

phase 2 (FIGS. 3a–3c): as soon as the graduation corresponding to the required altitude (5 500 in this example) is in line with the pointer 11 indicating the vertical speed (FIG. 3a), the pilot reduces the rate of climb (vertical speed) so that the pointer continues to point to the required altitude (FIG. 3b), the scale 8 continuing to scroll. The vertical speed of the aircraft therefore becomes proportional to the remaining altitude difference to the required altitude, which guarantees regular and repetitive convergence with no tendency to overshoot. At the end of this phase (FIG. 3c), the vertical speed pointer 11, still pointing towards the required altitude graduation (which in the end becomes the actual altitude), coincides with the fixed index 9 for a vertical speed which is then tending towards zero. This phase therefore leads in theory to asymptotic interception of the required altitude as shown in FIG. 4.

On this graph showing the altitude Z as a function of time t up to a required altitude $Z_{ref}$, the phase 1(A) is characterized by climbing at a constant vertical speed $V_Z$ (nominal rate of climb), while in phase 2(B) and until final acquisition (C) of the required altitude, climbing is effected at a variable vertical speed:

$$V_Z(t)=k(Z_{ref}-Z(t))$$

where $$Z(t)=Z_{ref}-(Z_{ref}-Za)e^{-k(t-t1)}$$

whence $$V_Z(t)=k(Z_{ref}-Za)e^{-k(t-t1)}$$

the gain k being a function of the display ratio between the vertical speed and altitude scales on the information display screen 7, Za representing the current altitude and t1 the time at the end of phase 1.

Note that a low value of k increases the length of phase 2 and increases the anticipation altitude, which is disadvantageous from an operational point of view, whereas a high value of k reduces the duration of phase 2 and reduces the anticipation altitude. However, in this latter case, it is more difficult to control the vertical speed in accordance with the altitude difference. A good compromise is obtained with a value of k in the order of 2 000 feet per minute for an altitude difference of 300 feet.

The above example refers to acquisition of altitude by climbing. Acquisition of altitude by descending in accordance with the invention is carried out in the same way except for the "direction". Moreover, as seen in FIG. 4, the actual acquisition curve $F_R$ differs only slightly from the theoretical curve $F_T$, as is normal, firstly to allow for actual flight conditions and secondly to reach the required altitude in a finite time.

With regard to the present invention as explained hereinabove, the following practical aspects will further be noted:

the pilot can adjust the vertical speed of the aircraft to suit himself: continuously or through n successive designations, their number and frequency depending on how much attention he is currently able to devote to them. Accordingly, since the pilot has continuous direct visual control over his path relative to the asymptotic ideal path, the two being of a similar nature, he can even accelerate or slow down the convergence process without difficulty;

the pilot can also benefit from the information display of the invention for altitude stabilization (once the altitude is acquired), by pointing the vertical speed pointer to the required altitude whenever the latter departs from the current value, which causes it to return as quickly as possible to a point in line with the fixed horizontal index, indicating the current altitude value.

Figure 5:
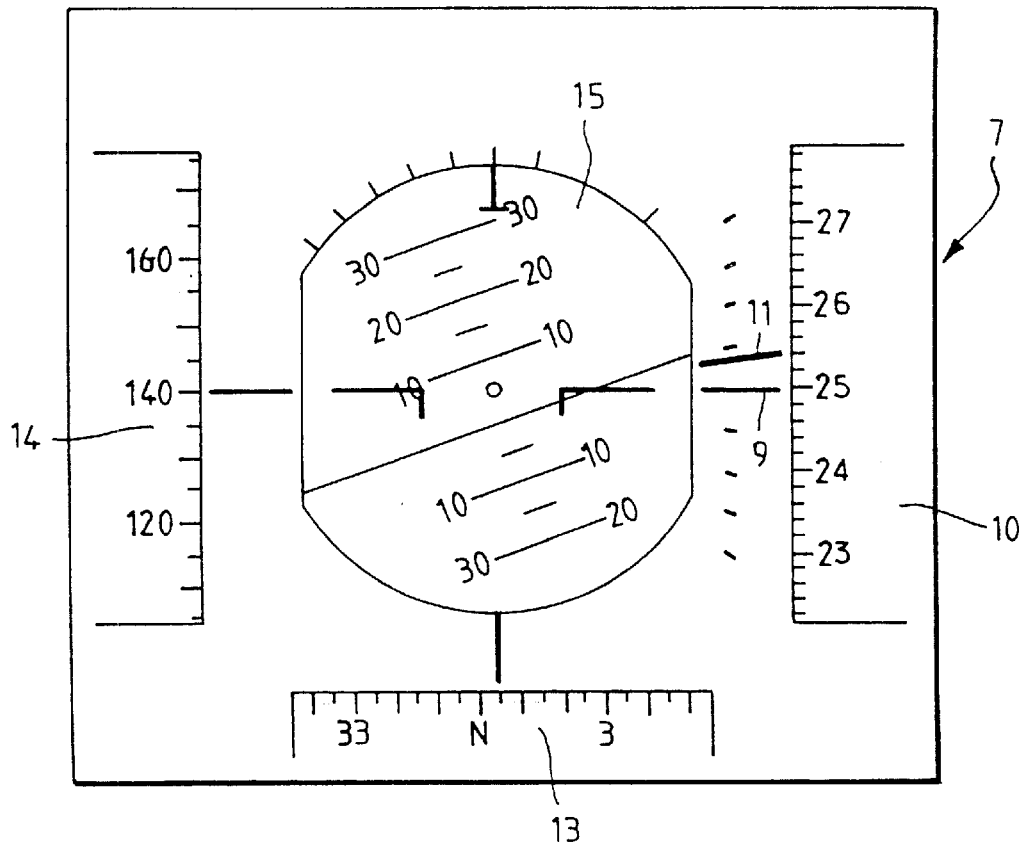
FIG. 5 shows one example of the layout of the display screen of the indicator of the invention on an aircraft instrument panel screen.

FIG. 5 shows one advantageous arrangement of the display screen 7 of the indicator of the invention on an aircraft instrument panel screen also showing a heading 13, an airspeed 14 and an artificial horizon 15.

As can be seen in this figure, the vertical speed pointer 11 is between the artificial horizon 15 and the altimeter 7, 10, pointing towards the latter, of course. This position of the pointer 11 is in fact fundamental to assisting with control of the flight of the aircraft, in particular when the latter is a helicopter, for reasons of readability associated with the logical eye movements of the pilot. The pointer rotates in a logical and appropriate manner about the center of the instrument panel screen.

The use of the indicator therefore becomes second nature, because of a knock-on effect. This expression means that:

the pilot essentially controls the trim of the helicopter (by means of the cyclic pitch control) to adapt it to an optimal vertical speed (obtained also with a collective pitch set by the corresponding collective pitch lever), and monitors the trim using the artificial horizon 15 (in the center in the FIG. 5), this attitude modification indirectly generates variations in the indications of the vertical speed pointer 11, to the right of the artificial horizon, and then consecutive variations in the indications of the altimeter, also to the right of the pointer, so that the observed variations of the aforementioned three parameters are in the same sense, which is highly advantageous.

In other words, the action of the pilot generates effects that propagate in the correct sense towards the exterior of the indicator, from the modification of the trim, via that of the pointer to, finally, that of the altimeter.

Consequently, the central position of the pointer 11 is novel, being particularly appropriate for a helicopter given the specifics of this type of aircraft, in particular the many changes that are possible in flight.

What is claimed is:

1. An altitude and vertical speed indicator for aircraft, the indicator comprising:

first and second sensors for measuring an altitude and a vertical speed of the aircraft, respectively, and for supplying signals representing the altitude and the vertical speed;

processing means for processing the signals supplied by said first and second sensors to produce processed signals; and display means, comprising a display screen, for displaying on the display screen an altitude indication and a vertical speed indication representing the processed signals, the display means comprising:

altitude indication means for displaying on the display screen the altitude indication; and vertical speed indication means, in line with said altitude indication means, for displaying on the display screen the vertical speed indication;

said altitude indication means and said vertical speed indication means being coupled such that the vertical speed indication is at all times in line with a future altitude indication which represents a future altitude corresponding to the vertical speed;

wherein:

said altitude indicator means comprises a graduated scale mobile past a fixed marker;

said vertical speed indicator means comprises a pointer rotatable about a point of intersection of a straight line segment through said fixed marker and a straight line segment through said pointer and pointing towards said mobile graduated scale, an angle defined by said fixed marker and said pointer being representative of the vertical speed; and said display means further comprises means for displaying an artificial horizon and an altimeter on the display screen, the pointer being disposed between the artificial horizon and the altimeter and pointing towards the altimeter.

2. The indicator claimed in claim 1 wherein said pointer is symbolized on said display screen by a straight line segment.

3. The indicator claimed in claim 1, wherein said processing means comprises:

a digital computer for converting physical altitude and vertical speed data represented by said signals representing said altitude and said vertical speed into data represented by said processed signals and suitable for display on said display screen; and a symbol generator for showing on said screen, based on information supplied by said digital computer, graphical characteristics of a presentation of the altitude and vertical speed.

4. The indicator claimed in claim 3 wherein said processor means further comprise, between said first and second sensors and said digital computer, a primary reference system supplying the physical altitude and vertical speed data in digital form.

5. The indicator claimed in claim 1 wherein the graduated scale is vertically mobile past the fixed marker.

* * * * *